United States Patent [19]

Masuoka et al.

[11] Patent Number: 4,883,852

[45] Date of Patent: Nov. 28, 1989

[54] ANTIFOULING COATING

[75] Inventors: Shigeru Masuoka; Hiroshi Doi, both of Hyogo, Japan

[73] Assignee: Nippon Oil and Fats Co., Ltd., Tokyo, Japan

[21] Appl. No.: 209,813

[22] Filed: Jun. 22, 1988

Related U.S. Application Data

[63] Continuation of Ser. No. 947,296, Dec. 29, 1986.

[30] Foreign Application Priority Data

Dec. 27, 1985 [JP] Japan .................................. 60-298918
May 30, 1986 [JP] Japan .................................. 61-126988
Oct. 27, 1986 [JP] Japan .................................. 61-255473

[51] Int. Cl.$^4$ .............................................. C08F 30/08
[52] U.S. Cl. ...................................... 526/279; 524/251; 524/268; 524/315; 524/318; 524/487; 524/488
[58] Field of Search ................ 526/279; 524/487, 488, 524/268, 251, 315, 318

[56] References Cited

U.S. PATENT DOCUMENTS 4,593,055  6/1986  Gitlitz et al. ......................... 523/177

FOREIGN PATENT DOCUMENTS

| 48461 | 3/1982 | European Pat. Off. | ............ 526/279 |
|---|---|---|---|
| 58-167606 | 10/1983 | Japan | .................................... 526/279 |
| 59-166514 | 9/1984 | Japan | .................................... 526/279 |
| 309017 | 9/1971 | U.S.S.R. | ............................... 526/279 |

| 1444110 | 7/1976 | United Kingdom . |
|---|---|---|
| 2192400 | 1/1988 | United Kingdom . |

OTHER PUBLICATIONS

Great Britain Search Report.

Primary Examiner—Joseph L. Schofer
Assistant Examiner—N. Sarofim
Attorney, Agent, or Firm—Sughrue, Mion, Zinn, Macpeak & Seas

[57] ABSTRACT

An antifouling coating is described, that contains as its essential components a polymer of one or more of the monomers A represented by formula (1) and/or a copolymer composed of one or more of the monomers A and one or more monomers B that are radical-copolymerizable with said monomer A:

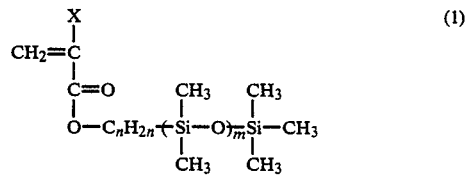

wherein X is a hydrogen atom or a methyl group; n is an integer of 2 to 4; and m signifies the average degree of polymerization and ranges from 0 to 70.

9 Claims, 1 Drawing Sheet

ANTIFOULING COATING

This is a continuation of application Ser. No. 06/947,296 filed Dec. 29, 1986.

FIELD OF THE INVENTION

The present invention relates to an antifouling coating that contains a polymer having polydimethylsiloxane groups and/or trimethylsilyl groups in side chains.

BACKGROUND OF THE INVENTION

The bottoms of ships, buoys and other structures that are submerged in seawater such as cooling water intake or discharge pipes are infested with organisms such as barnacles, tube worms, mussels and algae that attach to the surfaces of these structures and cause various troubles. It is routine practice to prevent the attachment of these marine organisms by coating the surface of the aforementioned items with antifouling paints. Antifouling paints are roughly divided into two classes. The antifouling paints of one class (A) employ antifoulants such as organotin copolymers and cuprous oxide that are capable of preventing the attachment of fouling organisms and have low solubility in seawater. Paints that employ organotin compounds as antifoulants are shown in Japanese patent Publication Nos. 21426/65, 9579/69, 13392/71, 20491/74, 11647/76 and 48170/77. The antifouling paints of the second class (B) do not employ any antifoulants and will not dissolve in seawater; instead, they use silicone rubbers that cure by the action of a catalyst or moisture to form a crosslinked film. For instance, an antifouling paint that uses a curable silicone rubber as a coating agent is shown in Japanese patent Publication No. 5974/78. An antifouling paint that uses a mixture of a silicone oil and an oligomer-like silicone rubber having a terminal hydroxyl group is shown in Japanese patent application (OPI) No. 96830/76 (the term "OPI" as used herein refers to a "published unexamined Japanese patent application"). A mixture of a curable silicone rubber and a flowable organic compound that does not contain a metal or silicon is shown in Japanese patent application (OPI) No. 79980/78. A paint that serves to prevent the attachment of fouling marine organisms is also shown in Japanese patent Publication No. 3433/85 and this paint is composed of a mixture of an oligomer-like low temperature curing silicone rubber (such as ones available from Shin-Etsu Chemical Co., Ltd. under the trade names of "KE 45TS" and "KE 44 RTV") and liquid paraffin or petrolatum.

The antifouling paints of class (A) are further divided into two subclasses. In one subclass of such antifouling paints, the film-forming resin does not dissolve in seawater and only the antifoulant dissolves in seawater to prevent the attachment of marine organisms. The coatings formed from this class of antifouling paints exhibit the intended effect during the initial period of application but after the antifoulant on the surface of the coating is lost as a result of its dissolution in seawater, the antifoulant in the deeper area of the coating will gradually dissolve. However, the dissolution rate of the antifoulant decreases as the depth of the area in which it is present in the film of coating increases, and the antifouling effect of the paint becomes insufficient in the long run.

In the second subclass of antifouling paints of class (A), both the antifoulant and the film-forming resin dissolve in seawater. The antifouling effect is achieved solely by the antifoulant or by a combination of the antifoulant and the resin component (e.g., an organotin copolymer) and, in either case, the surface of the coating dissolves in seawater to continuously provide the antifouling film of coating with an active surface. Therefore, the coating formed from this type of antifouling paints is capable of maintaining the desired antifouling effect over a longer period than the aforementioned first subclass of paints (A). However, the effect of this type of antifouling paints is not completely satisfactory because the film of coating they form is consumed fairly rapidly. In addition, the antifouling paints that employ antifoulants have one common problem in that the antifoulants have a potential for polluting the sea and killing marine products such as fish and shells.

Antifouling paints of class (B) are designed to prevent the attachment of marine organisms by making use of the slipping property (low surface energy) of the silicone rubber coating. However, these paints have the following disadvantages associated with the mechanism of film formation that involves the crosslinking of silicone rubbers after paint application.

The first problem is associated with the curing of the applied coating. For instance, when an antifouling paint of the type described in Japanese patent Publication No. 3433/85 that employs a low temperature curing oligomer-like silicone rubber that cures by the action of moisture in air to form a film of coating is applied to a substrate, the crosslinking agent incorporated to control the curing condensation reaction of the silicone rubber is activated by the moisture or temperature of air to cause premature curing of the surface of the coating. This retards the curing of the deeper portion of the coating to produce an insufficiently cured film which is most likely to blister or separate from the substrate. Furthermore, the slow penetration of moisture into the bulk of the coating prolongs the time required to achieve complete curing of the coating.

If the antifouling paint of the type described above is applied in a hot and humid atmosphere, the hydrolysis of the crosslinking agent predominates over the crosslinking reaction and the resulting coating does not have a sufficient crosslink density to provide satisfactory properties.

In a dry climate, the amount of aerial moisture is too small to cause hydrolysis of the crosslinking agent and the applied coating will cure very slowly. In order to avoid this problem, catalysts such as tin compounds and platinum are sometimes used as curing accelerators but their effectiveness is limited in cold climates.

The second problem concerns the case of top-coating. In the usual case, the solvent in a paint for topcoating slightly dissolves the surface of the undercoat to ensure good intercoat bonding. However, in the application of the antifouling paint under consideration, the silicone rubber in the first applied coating cures to such an extent that the solvent in a paint for top-coating is not capable of dissolving the surface of the silicone rubber to provide satisfactory intercoat bonding.

The third problem is related to pot life. The actual coating operation is prolonged if the item to be treated is large in size or has a complex structure. In addition, the operation may be interrupted by unexpected rainfall. In view of these possibilities, antifouling paints having short pot lives present great inconvenience in coating operations.

The fourth problem is associated with storage stability. Antifouling paints, after being prepared, are stored until use and the duration of such storage sometimes extends for a long period. Therefore, the manufacture of paints that will cure by the action of moisture necessitates the filling of their containers with a dry nitrogen gas. In addition, once the container is opened, aerial moisture will get into cause curing of the surface of the paint or an increase in its viscosity. Paint that has undergone such changes is no longer suitable for use.

SUMMARY OF THE INVENTION

The present inventors made concerted efforts to develop an antifouling coating that possesses none of the aforementioned disadvantages of the conventional products and which yet exhibits superior antifouling effects. As a result of these efforts, the inventors have succeeded in creating an effective antifouling coating that does not use any antifoulant but uses a specified polymer of the type which dries by solvent volatilization and which has polydimethylsiloxane groups and/or trimethylsilyl groups in side chains. Unlike the silicone rubber described above in connection with the prior art, the polymer specified by the present invention dries by solvent volatilization and hence is inherently free from the problems associated with curing processes, cohesion of interlayers, pot life and storage stability. What is more, the film formed from this polymer provides a superior surface slipping property to ensure improved antifouling effects.

The present inventors have also found that further improvements in antifouling effects can be achieved by incorporating a slipping agent such as petroleum waxes, silicone oils, fats and oils in the specified polymer.

An object, therefore, of the present invention is to provide an industrially useful antifouling coating that solves all of the problems associated with the conventional antifouling paints and which yet achieves much better antifouling effects.

In order to achieve this object, the present inventors conducted intensive studies and have succeeded in preparing an antifouling coating that is based on a polymer of the type which dries upon solvent volatilization. This coating is free from all of the defects of the known antifouling paints which employ a silicone rubber either alone or in combination with a silicone oil or paraffin and yet produces a coating surface that has a small enough angle of slip to exhibit better antifouling effects.

The antifouling coating of the present invention contains as its essential components a polymer of one or more of the monomers A represented by formula (1) and/or a copolymer which is composed of one or more of the monomers A and one or more monomers B that are radical-copolymerizable with said monomer A:

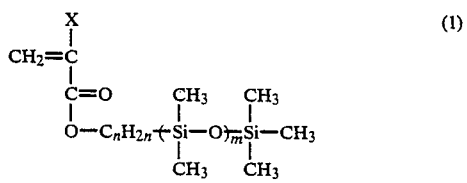

wherein X is a hydrogen atom or a methyl group; n is an integer of 2 to 4; and m signifies the average degree of polymerization and ranges from 0 to 70.

If this polymer (hereinafter designated as polymer A) or copolymer (hereinafter designated as copolymer AB) is used in combination with a specified slipping agent, a further improvement in the antifouling effects of the coating can be achieved without sacrificing the advantages resulting from the use of polymer A or copolymer AB.

DETAILED DESCRIPTION OF THE INVENTION

Figure 1A:
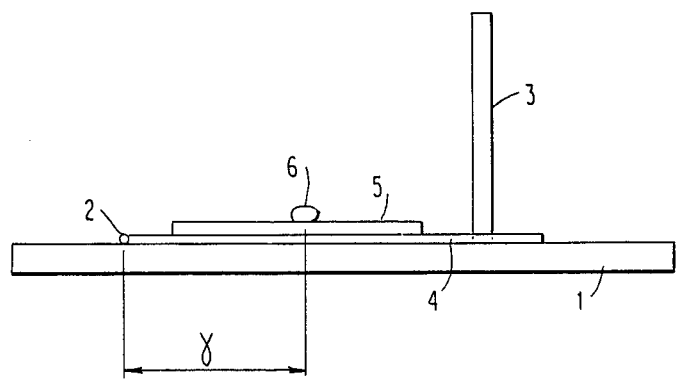
FIGS. 1(A) and (B) are side views showing how to measure the slip angle of the surface of the antifouling coating film.

Monomer A used in the present invention for preparing polymer A or copolymer AB is an unsaturated monoester represented by formula (1) which has a polydimethylsiloxane group ($m > 1$) or a trimethylsilyl group ($m = 0$) in the molecule. In formula (1), m is specified to be within the range of 0 to 70; if m is greater than 70, the polymerizability or copolymerizability of monomer A is decreased to an extent which renders it difficult to attain polymer A or copolymer AB in a form that is capable of producing a uniform film of coating. In formula (1), n is specified to be within the range of 2 to 4. If n is less than 2, the linkage at the esterforming portion of monomer A becomes weak and during polymerization or during the use of the resulting coating the ester linkage dissociates to either reduce the antifouling effect of the coating or shorten the duration of time during which it exhibits the intended antifouling effect. If n is more than 4, the polymer becomes too soft to form a satisfactory film of coating.

Examples of the monomer A represented by formula (1) are hereinafter listed by their specific names: illustrative compounds having a trimethylsilyl group include trimethylsilylethyl acrylate or methacrylate, trimethylsilylpropyl acrylate or methacrylate, and trimethylsilylbutyl acrylate or methacrylate; illustrative compounds having a polydimethylsiloxane group include polydimethylsiloxanethyl acrylate or methacrylate ($m \leq 70$), polydimethylsiloxanepropyl acrylate or methacrylate ($m \leq 70$), and polydimethylsiloxanebutyl acrylate or methacrylate ($m \leq 70$).

These compounds as examples of monomer A are readily available commercially or can be attained by synthesis. Exemplary methods of synthesis include: a method wherein acrylic acid or methacrylic acid is reacted with an alkylene glycol to form a corresponding ester, which then is condensed with a trimethylsilyl or polydimethylsiloxane compound; and a method wherein an ester of acrylic or methacrylic acid with an allyl alcohol is subjected to an addition reaction with a trimethylsilyl or polydimethylsiloxane compound.

Monomer A may be copolymerized with a radical polymerizable monomer B to form copolymer AB, and illustrative compounds that can be used as monomer B include: methacrylate esters such as methyl methacrylate, ethyl methacrylate, butyl methacrylate, 2-ethylhexyl methacrylate, and 2-hydroxyethyl methacrylate; acrylate esters such as ethyl acrylate, butyl acrylate, 2-ethylhexyl acrylate, and 2-hydroxyethyl acrylate; maleate esters such as dimethyl maleate and diethyl maleate; fumarate esters such as dimethyl fumarate and diethyl fumarate; and styrene, vinyltoluene, α-methylstyrene, vinyl chloride, vinyl acetate, butadiene, acrylamide, acrylonitrile, methacrylic acid, acrylic acid and maleic acid.

Radical polymerizable monomer B serves as a modifying component that imparts desirable properties to the antifouling coating; this monomer is also useful for the purpose of attaining a polymer that has a higher molecular weight than the homopolymer of monomer A. The amount of monomer B used is appropriately determined in consideration of the properties it imparts and the antifouling effect achieved by monomer A. Generally, the ratio of monomer B is not more than 90 wt%, preferably not more than 70 wt%, of the total amounts of monomer A and monomer B. The reason for selecting this range is that if the proportion of monomer A in copolymer AB is at least 10 wt%, especially at least 30 wt%, the intended antifouling effect can be satisfactorily achieved by monomer A.

Polymer A or copolymer AB may be formed by polymerizing monomer A either alone or in combination with monomer B in the presence of a radical polymerization initiator in accordance with routine procedures. Methods of polymerization include solution polymerization, bulk polymerization, emulsion polymerization and suspension polymerization. Illustrative radical polymerization initiators are azo compounds such as azobisisobutyronitrile and triphenylmethylazobenzene, and peroxides such as benzoyl peroxide and di-tert-butyl peroxide.

The polymer A and copolymer AB to be prepared by the methods described above preferably have weight average molecular weights within the range of 1,000 to 150,000. If the molecular weight of the polymer A or copolymer AB is too low, it is difficult to form a dry uniform film. If the molecular weight of polymer A or copolymer AB is too high, it makes the varnish high viscous. Such a high viscosity varnish should be thinned with a solvent for formulating a coating. Therefore, the resin solids content of the coating is reduced and only a thin dry film can be formed by a single application. This is inconvenient in that several applications of coating are necessary to attain a predetermined dry film thickness.

In accordance with the present invention, a slipping agent may be used in combination with polymer A and/or copolymer AB. Any compound may be used as this slipping agent so long as it is capable of substantially maintaining or lowering the small angle of slip that is possessed by the surface of the film of coating formed from the polymer A and/or copolymer AB. The following five classes of materials that impart slip properties to the film of coating may be used as slipping agents in the present invention.

(1) petroleum waxes of the class specified in JIS K 2235, which include paraffin wax e.g., having a melting point of from about 48.9° C., microcrystalline wax e.g., having a melting point of about 60° C. or over and petrolatum e.g., having a melting point of from about 45° C. to 80° C.;

(2) liquid paraffins of the class specified in JIS K 2231, which are illustrated by equivalents to ISO VG 10, ISO VG 15, ISO VG 32, ISO VG 68, and ISO VG 100 e.g., having a kinetic viscosity of from about 9 to 110 centistokes at 40° C.;

(3) silicone oils having kinetic viscosities of not more than 55,000 centistokes (cSt) at 25° C., which are illustrated by those available from Shi-Etsu Chemical Co., Ltd. under the trade names of KF 96 L-0.65, KF 96 L-2.0, KF 96-30, KF 96 H-50,000, KF 965, KF 50, KF 54 and KF 69; dimethyl silicone oil is most common but other silicone oils such as methylphenyl silicone oil may also be used;

(4) fatty acids or esters thereof having melting points of −5° C. or higher and not less than 8 carbon atoms; illustrative fatty acids that satisfy these requirements include caprylic acid, capric acid, lauric acid, myristic acid, palmitic acid, stearic acid, cerotic acid, montanic acid, melissic acid, lauroleic acid, oleic acid, vaccenic acid, gadoleic acid, cetolic acid, selacholeic acid, and juniperic acid; illustrative esters of these fatty acids include stearyl stearate, butyl laurate, octyl palmitate, butyl stearate, isopropyl stearate, cetyl palmitate, ceryl cerotate, myricyl palmitate, melissyl melissate, spermaceti, bees wax, carnauba wax, montan wax, Chinese insect wax, tristearin, tripalmitin, triolein, myristodilaurin, caprylolauromyristin, stearopalmitoolein, monostearin, monopalmitin, distearin, dipalmitin, tallow, lard, horse fat, mutton fat, cod-liver oil, coconut oil, palm oil, Japan tallow, Kapok oil, cacao butter, Chinese vegetable tallow, and illipe butter;

(5) organic amines having an alkyl or alkenyl group containing 12 to 20 carbon atoms, such as dodecylamine, tetradecylamine, hexadecylamine, octadecylamine, oleylamine, tallow alkylamines, coco-alkylamines, soybean alkylamines, didodecylamine, di-tallow-hydrogenated alkylamines, dodecyldimethylamine, coco-alkyldimethylamine, tetradecyldimethylamine, hexadecyldimethylamine and octadecyldimethylamine.

The slipping agents specified above are used in amounts that should be properly determined in consideration of the drying properties, adhesion to substrate and antifouling effects offered by the polymer A and/or copolymer AB. Generally, the slipping agents are used in amounts of 1 to 70 wt%, preferably 5 to 50 wt%, of the total amount of polymer A and/or copolymer AB and the slipping agent.

As will be apparent from the foregoing description, the antifouling coating of the present invention is typically used in the form of a solution wherein polymer A and/or copolymer AB together with the slipping agent specified above are dissolved in an organic solvent. Therefore, practical considerations indicate that it is preferred to prepare polymer A and/or copolymer AB by solution polymerization or bulk polymerization.

Examples of the organic solvent that can be used to prepare a solution of polymer A and/or copolymer AB which optionally contains the slipping agent include: aromatic hydrocarbons such as xylene and toluene; aliphatic hydrocarbons such as hexane and heptane; esters such as ethyl acetate and butyl acetate; alcohols such as isopropyl alcohol and butyl alcohol; ethers such as dioxane and diethyl ether; and ketones such as methyl ethyl ketone and methyl isobutyl ketone. These organic solvents may be used either alone or in admixture.

The organic solvents are preferably used in such amounts that the concentration of polymer A and/or copolymer AB in the solution generally ranges from 5 to 80 wt%, preferably from 30 to 70 wt%. The solution preferably has a viscosity of 1 to 10 poises at 25° C. in order to facilitate the film formation from the solution.

The antifouling coating of the present invention thus prepared may optionally contain colorants that are intoxic and will not dissolve in seawater. Suitable colorants are pigments such as red oxide and titanium dioxide, and dyes. The coating agent may also contain conventional antisagging agents, antiflooding agents, antisetting agents, and antifoaming agents.

The surfaces of structures to be submerged in seawater are treated with the antifouling coating of the present invention to form an antifouling film of coating. The procedure of such treatment is simple; for instance, a solution of the coating is applied to the surface of the structure of interest by an appropriate means and the solvent is removed by evaporation at ordinary temperatures or under heating. This suffices for the purpose of forming a uniform film of antifouling coating that exhibits good slip properties.

The polymer A and/or copolymer AB used in the present invention has the polydimethylsiloxane group and/or trimethylsilyl group that derives from monomer A and because of these groups, the polymer A or copolymer AB is capable of forming a film of coating that has a very slippery surface. Therefore, the film itself of the coating formed from such polymer or copolymer has the ability to physically prevent the attachment of fouling marine organisms.

Radical polymerizable monomer B in copolymer AB serves as a modifying component that imparts an adequate level of slip properties to the surface of the film of coating formed from copolymer AB. Monomer B is also effective in forming a polymer having a higher molecular weight than a homopolymer of monomer A or in controlling the hardness and strength of the film of coating.

The slipping agent which may be used in the present invention in combination with polymer A and/or copolymer AB is an important component since the combination ensures prolonged antifouling effects in a marine environment where the growth of fouling organisms is active. The present inventors consider that this enhanced retention of antifouling effects is due to the maintained slip properties of the film of antifouling coating that is achieved by the surface lubricating action of the slipping agent and by the ability to retard the deterioration of the film formed from polymer A and/or copolymer AB.

The polymer specified in the present invention for use in an antifouling coating is inert and forms a thermoplastic film of coating that dries upon solvent volatilization and which is insoluble in seawater. Therefore, the antifouling coating of the present invention has the following advantages over the conventional antifouling paints.

First, it is stable and can be formulated in a paint without experiencing any risk of deterioration by reaction with other active ingredients. The container of the paint does not need to be filled with an inert gas because it has an unlimited pot life.

Secondly, the paint dries quickly after application and yet will not blister or separate from the substrate because it will not experience any inadequate curing in the deeper area of coating and the drying speed is not affected by moisture or temperature.

Thirdly, the film of coating formed from the coating of the present invention can be topcoated with a similar or dissimilar paint without sacrificing the strength of intercoat bonding.

Fourthly, the film formed from the coating of the present invention will not be eroded by contact with seawater and therefore retains good antifouling effects over a prolonged period. The superior antifouling effects of the film are supported by the fact that its surface has an angle of slip that is much smaller than that exhibited by the film of coating formed from the conventional antifouling paint employing a crosslinked silicone rubber.

The present invention is hereinafter described in greater detail with reference to the following examples of polymer preparation, working examples and comparative examples, wherein all parts are on a weight basis. The data for viscosity were obtained by the measurement of bubble viscosities at 25° C., and the data for molecular weights are indicated in terms of weight average molecular weights as measured by GPC (gel permeation chromatography).

PREPARATION EXAMPLES 1, 2, 4, 5 AND 7 TO 9

A flask equipped with a stirrer was charged with a cooking solvent a (for its name and amount, see Table 1), which was heated to a predetermined temperature for reaction. A liquid mixture of monomer A, monomer B and a radical polymerization initiator a (for their names and amounts, see Table 1) was introduced dropwise into the flask with stirring over a period of 2 to 3 hours. After completion of the addition, the contents of the flask were held at the predetermined temperature for reaction for a period of 30 minutes. Subsequently, a mixture of a cooking solvent b and a radical polymerization initiator b (for their names and amounts, see Table 1) was added dropwise over a period of 20 hours, and the resulting mixture was held at the predetermined temperature for 3 to 5 hours with stirring so as to complete the polymerization reaction. Finally, a solvent was added to dilute the reaction product. By these procedures, copolymer solutions I, II, IV, V, VII to IX were prepared.

PREPARATION EXAMPLES 3 AND 10

A heat- and pressure-resistant vessel was charged with a monomer A, monomer B and a radical polymerization initiator a in accordance with the formulations shown in Table 1. The vessel was completely closed and the contents were heated to a predetermined temperature for reaction under shaking. Thereafter, the shaking of the vessel was continued for 2 hours until polymerization reaction was completed. A diluting solvent was then added and shaking was continued for an additional 3 hours to obtain a solution. By these procedures, copolymer solutions III and X were prepared.

PREPARATION EXAMPLE 6

A flask equipped with a stirrer was charged with a cooling solvent a, a monomer A and a radical polymerization initiator a and the contents of the flask were heated to a predetermined temperature for reaction with stirring. The stirring of the reaction mixture was continued at the predetermined temperature for 3 hours to obtain a copolymer solution VI.

TABLE 1

| Composition (parts) | Preparation Example | | | | | | | | | |
|---|---|---|---|---|---|---|---|---|---|---|
| | 1 | 2 | 3 | 4 | 5 | 6 | 7 | 8 | 9 | 10 |
| Cooking Solvent a | | | | | | | | | | |
| Butyl acetate | 120 | 180 | | | | 30 | | 180 | | |

TABLE 1-continued

| Composition (parts) | Preparation Example | | | | | | | | | |
|---|---|---|---|---|---|---|---|---|---|---|
| | 1 | 2 | 3 | 4 | 5 | 6 | 7 | 8 | 9 | 10 |
| Xylene | | | | 50 | 15 | 100 | | 120 | | |
| Ethylene glycol monoethyl ether | | | | | 45 | | | | | |
| Monomer A (*1) | 120 | 180 | 55 | 15 | 25 | 100 | 36 | 120 | 180 | 13 |
| (See Note below for its structure) | | | | | | | | | | |
| (x) | (CH$_3$) | (CH$_3$) | (CH$_3$) | (H) | (CH$_3$) | (CH$_3$) | (CH$_3$) | (CH$_3$) | (CH$_3$) | (CH$_3$) |
| (n, m) | (3, 10) | (3, 3) | (3, 10) | (2, 70) | (4, 30) | (3, 0) | (3, 20) | (1, 8) | (5, 2) | (3, 75) |
| Monomer B | | | | | | | | | | |
| Methyl methacrylate | 120 | 169.2 | 45 | 85 | 58 | | 72 | 120 | 150 | 87 |
| Ethyl acrylate | | 10.8 | | | | | | | | |
| Methacrylic acid | | | | | 2 | | | | | |
| Butyl acrylate | | | | | 5 | | | | | |
| Styrene | | | | | 10 | | | | | |
| Butyl methacrylate | | | | | | | | 12 | 30 | |
| Radical polymerization initiator | | | | | | | | | | |
| Azobisisobutyronitrile | 1.2 | 3.6 | 5 | | 0.6 | | | 1.2 | 3.6 | |
| Benzoyl peroxide | | | | 3 | | 15 | 0.6 | | | 4 |
| Cooking Solvent b | | | | | | | | | | |
| Butyl acetate | 40 | 60 | | | | | 20 | | 60 | |
| Xylene | | | | 20 | | | | 40 | | |
| Ethylene glycol monoethyl ether | | | | | 20 | | | | | |
| Polymerization Catalyst b | | | | | | | | | | |
| Azobisisobutyronitrile | 0.6 | 1.8 | | | 0.6 | | | 0.6 | 1.8 | |
| Benzoyl peroxide | | | | 1.5 | | | 0.2 | | | |
| Diluting Solvent | | | | | | | | | | |
| Toluene | 80 | | | | | | 130 | | | |
| Xylene | | 120 | | | | | | 80 | 120 | |
| Butyl acetate | | | 100 | | | | | | | 100 |
| Methyl isobutyl ketone | | | | 30 | | | | | | |
| Butanol | | | | | 10 | | | | | |
| Methyl ethyl ketone | | | | | 35 | | | | | |
| Reaction Temperature (°C.) | 100 | 115 | 130 | 110 | 120 | 140 | 80 | 105 | 110 | 120 |
| Appearance of Polymer Solution | clear | clear | clear | translucent | clear | clear | clear | turbid | clear | turbid |
| Viscosity of Polymer Solution | U | H | A | P | K | A$_3$ | Z | W | K | F |
| Molecular Weight of Polymer (× 10$^3$) | 89 | 54 | 9 | 43 | 27 | 1 | 150 | 72 | 65 | 32 |

Note (*1):

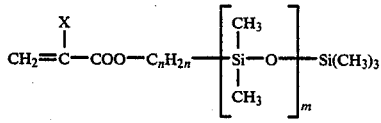

EXAMPLES 1 TO 43

Forty-three samples of antifouling coating were prepared by dispersing the copolymer solutions I to VII with a homomixer (2,000 rpm) in accordance with the formulations shown in Tables 2 and 3 (the figures in the tables are percents by weight). Paraffin wax 120P, paraffin wax 155P, microcrystalline wax 170M, and petrolatum Nos. 1 and 4 listed in Tables 2 and 3 are petroleum waxes of the types specified in JIS K 2235; ISO VG 10 and ISO VG 100 are liquid paraffins of the types specified in JIS K 2231; KF 96 L-10 and KF 96 H-50,000 are the trade names of Shin-Etsu Chemical Co., Ltd. for silicone oils; Oil Blue ®2N is the trade name of Orient Chemical Industry Co., Ltd. for a dye; and Disparon ®6900-20X and Aerosil ®300 are the trade names of Kusumoto Kasei K.K. and Nippon Aerosil Co., Ltd, respectively, for antisagging agents.

COMPARATIVE EXAMPLES 1 TO 15

Fifteen samples of antifouling coating having the formulations shown in Table 4 were prepared as in Examples 1 to 43 except that copolymer solutions III, V, VII to X and KE 45 TS (the trade name of Shin-Etsu Chemical Co., Ltd. for a 50 wt% toluene solution of a low temperature curing oligomer-like silicone rubber) or an organotin copolymer solution (Comparative Example 11) were employed.

The organotin copolymer solution used in Comparative Example 11 had been prepared by copolymerizing 40 parts of methyl methacrylate, 20 parts of octyl acrylate and 40 parts of tributyltin methacrylate; the copolymer had a weight average molecular weight of 90,000 and was dissolved in xylene to form a clear 50 wt% solution. The silicone oil designated as KF 96 H-60,000 in Table 4 was a product of Shinetsu Chemical Industry Co., Ltd. This silicone oil (kinetic viscosity: 60,000 cSt at 25° C.), caproic acid (carbon number: 6), camellia oil (m.p.: −17° C.) and methyl caproate (carbon number: 6) were not within the category of the slipping agents that are specified by the present invention for incorporation in the claimed antifouling coating.

TABLE 2

| | Example | | | | | | | | | | | | | | | | | | | | |
|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 |
| Copolymer Solution (I) | 45 | 50 | | | | | | | | | | | | | | | | | | | |
| Copolymer Solution (II) | | | 60 | | | | | | | | | | | | | | | | | | |
| Copolymer Solution (III) | | | | 50 | | | | | | | | | | | | | | | | | |
| Copolymer Solution (IV) | | | | | 55 | | | | | | | | | | | | | | | | |
| Copolymer Solution (V) | | | | | | 80 | | | | | | | | | | | | | | | |
| Copolymer Solution (VI) | | | | | | | 40 | | | | | | | | | | | | | | |
| Copolymer Solution (VII) | | | | | | | | 50 | 90 | 56 | 60 | 64 | 60 | 60 | 60 | 63 | 60 | 38 | 60 | 56 | 72 |
| Organic Amine | | | | | | | | | | | | | | | | | | | | | |
| Dodecylamine | | | | | | | | | 1 | | | | | | | | | | | | |
| Tetradecylamine | | | | | | | | | | 5 | 3 | | | | | | | | | | |
| Hexadecylamine | | | | | | | | | | | 3 | | | | | | | | | | |
| Octadecylamine | | | | | | | | | | | | 2 | | | | | | | | | |
| Dihydrogenated tallow-alkylmethylamine | | | | | | | | | | | | | 10 | | | | | | | | |
| Tetradecyldimethylamine | | | | | | | | | | | | | | 10 | | | | | | | |
| Tallow alkylamine | | | | | | | | | | | | | | | 10 | | | | | | |
| Soybean alkylamine | | | | | | | | | | | | | | | | 27 | 3 | 35 | | | |
| Petroleum Wax | | | | | | | | | | | 5 | 3 | | | | | | | 5 | | |
| Petrolatum No. 1 | | | | | | | | | | | | | | | | | | | 10 | | |
| Liquid Paraffin | | | | | | | | | | | 5 | | | | | | | | | 7 | |
| ISO VG 10 | | | | | | | | | | | | | | | | | | | | | |
| Silicone Oil KF 96 L-10 (kinetic viscosity: 10 cSt at 25° C.) | | | | | | | | | | | | | | | | | | | | | 4 |
| Fatty Acid Ester | | | | | | | | | | | | | | | | | | | | | |
| Tallow (m.p.: 45° C.) | | | | | | | | | | | 4 | 3 | | | | 2 | 5 | | | | |
| Palm oil (m.p.: 41° C.) | | | | | | | | | | | | | | | | | | 5 | | | |
| Pigment | | | | | | | | | | | | | | 2 | | | | 2 | | | |
| TiO₂ | | | | | | | | | | | | | 1 | | | 1 | | | | | |
| Dye | | | | | | | | | | | | | | | | | | | | | |
| Oil Blue 2N | | | | | | | | | | | | | | | | | | | | | |
| Antisagging Agent | | | | | | | | | | | | | | | | | | | | | |
| Disparon ® 6900-20X | 3 | | | 2 | | 2 | | 2 | 6 | 8 | 5 | 6 | | | | | 2 | 5 | 5 | 3 | 3 |
| Aerosil ® 300 | | 1 | 2 | | 3 | | | | | | | | 1 | 1 | 1 | 3 | | | | | |
| Diluting Solvent | | | | | | | | | | | | | | | | | | | | | |
| Toluene | 30 | 19 | 13 | 28 | 20 | | 40 | 48 | 3 | 8 | 15 | 22 | 5 | 4 | 5 | | 27 | 4 | 15 | 23 | 6 |
| Xylene | 22 | | 20 | | 10 | | 20 | | | 8 | | | 5 | 10 | 10 | 2 | | 10 | | 5 | 10 |
| Ethyl acetate | | 30 | | 20 | 2 | 18 | | | | 10 | | | 10 | 15 | 9 | | | | | 4 | 5 |
| Methyl isobutyl ketone | | | | | | | | | | | | | | | 5 | | | | | 2 | |
| Isopropyl alcohol | | | | | | | | | | 5 | | | 9 | | | 5 | | 6 | | | |
| Total | 100 | 100 | 100 | 100 | 100 | 100 | 100 | 100 | 100 | 100 | 100 | 100 | 100 | 100 | 100 | 100 | 100 | 100 | 100 | 100 | 100 |

TABLE 3

| | \multicolumn{22}{c}{Example} |
|---|---|---|---|---|---|---|---|---|---|---|---|---|---|---|---|---|---|---|---|---|---|---|
| | 22 | 23 | 24 | 25 | 26 | 27 | 28 | 29 | 30 | 31 | 32 | 33 | 34 | 35 | 36 | 37 | 38 | 39 | 40 | 41 | 42 | 43 |
| Copolymer Solution (I) | 42 | | | | | | | | | | | | | | | | | | | | | |
| Copolymer Solution (II) | | 40 | 54 | | | | | | | | | | | | | | | | | | | |
| Copolymer Solution (III) | | | | 64 | | | 65 | | 48 | 56 | 72 | | | | 54 | | 72 | | 54 | 54 | 56 | 56 |
| Copolymer Solution (IV) | | | | | | 56 | | | | | | | | | | | | | | | | |
| Copolymer Solution (V) | | | | | 60 | | | 72 | | | | 64 | | | | 56 | | | | | | |
| Copolymer Solution (VI) | | | | | | | | | | | | 40 | | 56 | | | | 64 | | | | |
| Copolymer Solution (VII) | | | | | | | | | | | | | | | | | | | | | | |
| Petroleum Wax | | | | | | | | | | | | | | | | | | | | | | |
| Paraffin wax 120P | 9 | | | | | | | | | | | | | | | | | | | | | |
| Paraffin wax 155P | | 20 | | | | | | | | | | | | | | | | | | | 7 | |
| Microcrystalline wax 170M | | | 3 | | | | | | | | | | | | | | | | | 3 | | |
| Petrolatum No. 1 | | | | 8 | 20 | | | | | | | | | | | | | | | | | |
| Petrolatum No. 4 | | | | | | | 14 | | | | | | | | | | | | | | | |
| Liquid Paraffin | | | | | | 7 | | | | | | | | | | | | | | | | |
| ISO VG 10 | | | | | | | | | 6 | | | | | | | | | | | | | |
| ISO VG 100 | | | | | | | | 4 | | | | | | | | | | | | | | |
| Silicone Oil | | | | | | | | | | 12 | | | | | | | | | | | | |
| KF 96 L-10 (kinetic viscosity: 10 cSt at 25° C.) | | | | | | | | | | | 9 | | | | | 7 | | | | | | |
| KF 96 H-50000 (kinetic viscosity: 5 × 10⁴ cSt at 25° C.) | | | | | | | | | | | | | 8 | | | | 4 | | | | | |
| Fatty Acid | | | | | | | | | | | | | | | | | | | | | | |
| Stearic acid (m.p.: 70° C.) | | | | | | | | | | | | 20 | | | | | | | | | | 12 |
| Caprylic acid (m.p.: 17° C.) | | | | | | | | | | | 17 | | 16 | 21 | | | | | | | | |
| Fatty Acid Ester | | | | | | | | | | | | 7 | 10 | 10 | | | | | | | | |
| Tallow (m.p.: 45° C.) | | | | | | | | | | 11 | | | | | | | | | | | | |
| Lard (m.p.: 37° C.) | | | | | | | | | | | | | | | 33 | 16 | 12 | | 22 | 20 | | 7 |
| Japan tallow (m.p.: 53° C.) | | | 10 | 26 | 10 | 23 | 20 | 6 | 5 | 20 | | | | | 10 | 20 | 10 | 10 | 20 | 20 | 30 | 15 |
| Palm oil (m.p.: 41° C.) | | | 12 | | 5 | 5 | | 10 | 20 | | | | | | | | | | | | | |
| Spermaceti (m.p.: 48° C.) | | | 20 | | 5 | 4 | | 5 | 10 | | | | | | | | | | | | | 5 |
| Bees wax (m.p.: 63° C.) | | | | | | 2 | | | | | | | | | | | | | | | | |
| Stearyl stearate (m.p.: 63° C.) | | | | | | | | | | | | | | 12 | | | | | | | | |
| Tripalmitin (m.p.: 58° C.) | | | | | | | | | | | | 3 | | | 3 | | | 8 | | | | |
| Pigment | 2 | | 1 | 2 | | 3 | 1 | 3 | 1 | 1 | 2 | | 2 | 1 | | 2 | 2 | | 3 | 2 | 5 | 3 |
| TiO₂ | | | | | | | | | | | | | | | | 1 | | | 1 | | 2 | |
| Dye | | | | | | | | | | | | | | | | | | | | | | |
| Oil Blue @2N | | | | | | | | | | | | | | | | | | | | | | |
| Antisagging Agent | | | | | | | | | | | | | | | | | | | | | | |
| Disparon ® 6900-20X | | | | | | | | | | | | | | | | | | | | | | |
| Aerosil ® 300 | | | | | | | | | | | | | | | | | | | | | | |
| Diluting Solvent | | | | | | | | | | | | | | | | | | | | | | |
| Toluene | 27 | 30 | | | | | | | | | | | | | | | | | | | | |
| Xylene | 20 | 10 | | | | | | | | | | | | | | | | | | | | |
| Ethyl acetate | | | | | | | | | | | | | | | | | | | | | | |
| Methyl isobutyl ketone | | | | | | | | | | | | | | | | | | | | | | |
| Isopropyl alcohol | | | | | | | | | | | | | | | | | | | | | | |
| Total | 100 | 100 | 100 | 100 | 100 | 100 | 100 | 100 | 100 | 100 | 100 | 100 | 100 | 100 | 100 | 100 | 100 | 100 | 100 | 100 | 100 | 100 |

TABLE 4

| | Comparative Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Copolymer Solution (III) | | | | | | | | | | | | | | 42 | 42 |
| Copolymer Solution (V) | | | | | | | | | | | | | 42 | | |
| Copolymer Solution (VII) | | | | | | | | | | | | 42 | | | |
| Copolymer Solution (VIII) | 50 | | | 56 | | | | | | | | | | | |
| Copolymer Solution (IX) | | 50 | | | 60 | | | | | | | | | | |
| Copolymer Solution (X) | | | 50 | | | 42 | | | | | | | | | |
| Silicone Rubber | | | | | | | | | | | | | | | |
| KE 45 TS | | | | | | | 50 | 50 | 50 | 50 | | | | | |
| Solution of Organotin Copolymer | | | | | | | | | | | 40 | | | | |
| Petroleum Wax | | | | | | | | | | | | | | | |
| Petrolatum No. 1 | | | | | | | | | | | 10 | | | | |
| Petrolatum No. 4 | | | | | 12 | | | | | | | | | | |
| Liquid Paraffin | | | | | | | | | | | | | | | |
| ISO VG 10 | | | | | | | | | | 10 | | | | | |
| Silicone Oil | | | | | | | | | | | | | | | |
| KF 96 L-10 (kinetic viscosity: 10 cSt at 25° C.) | | | | | | | | | 10 | | | | | | |
| KF 96 H-60000 (kinetic viscosity: $6 \times 10^4$ cSt at 25° C.) | | | | | | | | | | | | 9 | | | |
| Fatty Acid | | | | | | | | | | | | | | | |
| Caproic acid | | | | | | | | | | | | | | 9 | |
| Fatty Acid Ester | | | | | | | | | | | | | | | |
| Palm oil (m.p.: 41° C.) | | | | | 20 | | | | | | | | | | |
| Camellia oil (m.p.: −17° C.) | | | | | | | | | | | | | 9 | | |
| Tripalmitin (m.p.: 58° C.) | | | | | | 9 | | | | | | | | | |
| Methyl caproate | | | | | | | | | | | | | | | |
| Pigment | | | | | | | | | | | | | | | |
| TiO$_2$ | | | | | | | | | | | 5 | | | | |
| Cuprous oxide | | | | | | | | | | | 40 | | | | |
| Antisagging Agent | | | | | | | | | | | | | | | |
| Disparon ® 6900-20X | 3 | 3 | 3 | | 2 | | | | | | 3 | 2 | 2 | 2 | 2 |
| Aerosil ® 300 | | | | 1 | | | | | | | | | | | |
| Diluting Solvent | | | | | | | | | | | | | | | |
| Toluene | 47 | 47 | 47 | | | 9 | 50 | 40 | 40 | 40 | | 20 | 20 | 20 | 20 |
| Xylene | | | | 21 | 18 | 20 | | | | | 12 | 22 | 15 | 22 | 22 |
| Ethyl acetate | | | | 10 | | 20 | | | | | | 5 | 5 | 5 | 5 |
| Methyl isobutyl ketone | | | | | | | | | | | | | 5 | | |
| Isopropyl alcohol | | | | | | | | | | | | | 2 | | |
| Total | 100 | 100 | 100 | 100 | 100 | 100 | 100 | 100 | 100 | 100 | 100 | 100 | 100 | 100 | 100 |

The performance of the samples of antifouling coating prepared in Examples 1 to 43 and Comparative Examples 1 to 15 was evaluated by a physical performance test, the measurement of slip angles for the surface of the film of coating formed from the individual samples and by an antifouling performance test. Each of the tests and measurement thereof was conducted by the procedures shown below. The results are shown in Tables 5 to 7.

Physical Performance Test

The storage stability, drying property and adhesion to a substrate were evaluated for each sample by the following methods.

(A) Storage Stability 200 ml of each sample was put into a glass container (capacity: 250 ml) which was closed with a cap. The container was stored in a humidified thermostatic chamber (70° C.×75% RH) for two weeks. The stability of the sample was determined in terms of any increase in its viscosity and evaluated by the following criteria: o, the increase in viscosity was less than 10% by the initial value; Δ, the increase was from 10% to less than 100% of the initial value; and x, the increase was at least 100% of the initial value.

(B) Drying Property

In accordance with the method specified in JIS K 5400.5.8, each of the samples was coated onto a glass plate for a wet film thickness of 100 μm with a film applicator and the drying property of the film was evaluated by the following criteria: o, the tack-free drying time was less than 1 hour; Δ, the tack-free drying time was from 1 hour to less than 3 hours; and x, the tack-free drying time was at least 3 hours. Each of the test pieces had been desiccated in a humidified thermostatic chamber (20° C.×75% RH).

(C) Adhesion to Substrate

Evaluation of adhesion to a substrate was conducted in accordance with the method of a cross cut adhesion test specified in JIS K 5400.6.15; each of the samples was coated onto a polished steel panel (150×70×1 mm) for a wet film thickness of 100 μm with a film applicator and dried for 1 week in a humidified thermostatic chamber (20° C.×75% RH); a 20 mm long crossed groove was cut through the film into the substrate with a cutter knife; the so prepared test piece was set in an Erichsen film tester and a steel ball was pressed against the center of the back side of the test piece to produce a vertical deformation of 10 mm. The adhesion of the film to the substrate was evaluated in terms of the length of peel from the substrate as measured from the center of the cross cut. The criteria used were as follows: o, 0 mm; Δ, less than 5 mm; and x, 5 mm or more.

Measurement of Slip Angle

Test plates were prepared in the same manner as in the case of the drying test (B) and the angle of slip on the surface of the film of coating formed on each test plate was measured with a slip angle meter. As shown in FIGS. 1(A) and (B), the slip angle meter was composed of a transparent glass plate 1, a fastening device 2, a support rod 3 and a movable plate 4. The movable plate 4 was disposed on the glass plate 1 in such a manner that it was fixed at one end A with the fastener 2 while the other end B was movable upwardly along the rod 3.

Figure 1B:
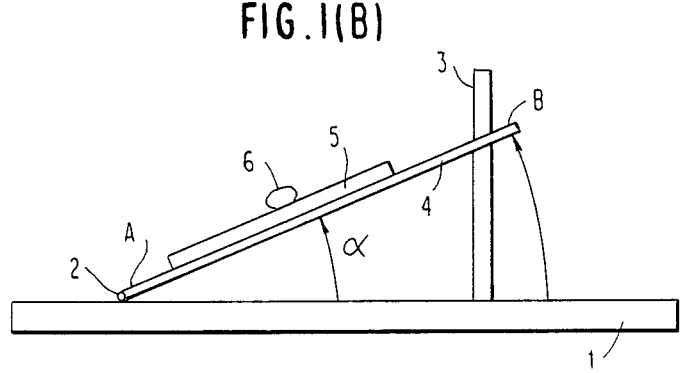

The procedures of slip angle measurement were as follows. First, as shown in FIG. 1(A), a test plate 5 was placed horizontally, with the film of coating facing up, on the movable plate 4, and a given amount (0.2 ml) of sterilized filtered seawater was injected with a syringe to deposit a waterdrop 6 at a position whose distance ($\gamma$) from the fastener 2 (i.e., one end A of the movable plate 4) was 185 mm. Then, as shown in FIG. 1(B), the other end B of the movable plate 4 was moved upwardly along the rod 3 at a speed of 1 mm/sec. The angle of inclination, $\alpha$, of the movable plate 4 at which the waterdrop 6 began to slide down the inclined test plate 5 was measured and used as the slip angle of the surface of the film of coating on the test plate.

All measurements were conducted in a humidified thermostatic chamber (25° C.×75% RH) and three measurements with each test plate were averaged to calculate the slip angle for that plate.

Antifouling Performance Test

Sand blasted steel panels (100×200×1 mm) were coated with a coal tar-vinyl based anticorrosive paint. Both surfaces of each panel were sprayed with two layers of a coating so as to provide a dry film thickness of 120 μm on each side.

The so prepared test panels were immersed in seawater at Yura Bay, Sumoto, Hyogo, Japan for 36 months, during which period the increase in the area of the test panel that was covered by the growth of fouling marine organisms (% attachment of fouling organisms) was measured at regular intervals.

TABLE 5

| | Example | | | | | | | | | | | | | | | | | | | | |
|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 |
| Storage stability | o | o | o | o | o | o | o | o | o | o | o | o | o | o | o | o | o | o | o | o | o |
| Drying property | o | o | o | o | o | o | o | o | o | o | o | o | o | o | o | o | o | o | o | o | o |
| Adhesion to substrate | o | o | o | o | o | o | o | o | o | o | o | o | o | o | o | o | o | o | o | o | o |
| Surface slip angle (degrees) | 8.3 | 8.5 | 9.1 | 8.8 | 8.8 | 8.6 | 8.6 | 8.5 | 7.9 | 8.1 | 8.7 | 7.2 | 8.3 | 7.5 | 7.8 | 9.5 | 8.4 | 9.8 | 8.5 | 8.6 | 7.9 |
| Antifouling test | | | | | | | | | | | | | | | | | | | | | |
| 3 mo. | 0 | 0 | 0 | 0 | 0 | 0 | 0 | 0 | 0 | 0 | 0 | 0 | 0 | 0 | 0 | 0 | 0 | 0 | 0 | 0 | 0 |
| 6 mo. | 0 | 0 | 0 | 0 | 0 | 0 | 0 | 0 | 0 | 0 | 0 | 0 | 0 | 0 | 0 | 0 | 0 | 0 | 0 | 0 | 0 |
| % Attachment of fouling organisms | | | | | | | | | | | | | | | | | | | | | |
| 12 mo. | 0 | 0 | 0 | 0 | 0 | 0 | 0 | 0 | 0 | 0 | 0 | 0 | 0 | 0 | 0 | 0 | 0 | 0 | 0 | 0 | 0 |
| 18 mo. | 0 | 0 | 0 | 0 | 0 | 0 | 0 | 0 | 0 | 0 | 0 | 0 | 0 | 0 | 0 | 0 | 0 | 0 | 0 | 0 | 0 |
| 24 mo. | 0 | 0 | 0 | 0 | 0 | 0 | 0 | 0 | 0 | 0 | 0 | 0 | 0 | 0 | 0 | 0 | 0 | 0 | 0 | 0 | 0 |
| 30 mo. | 5 | 1 | 3 | 3 | 1 | 2 | 3 | 1 | 0 | 0 | 0 | 0 | 0 | 0 | 0 | 0 | 0 | 0 | 0 | 0 | 0 |
| 36 mo. | 10 | 5 | 10 | 10 | 5 | 10 | 10 | 5 | 0 | 0 | 0 | 0 | 0 | 0 | 0 | 0 | 0 | 0 | 0 | 0 | 0 |
| 42 mo. | — | — | — | — | — | — | — | — | 0 | 0 | 0 | 0 | 0 | 0 | 0 | 0 | 0 | 0 | 0 | 3 | 7 |
| 48 mo. | — | — | — | — | — | — | — | — | 0 | 0 | 0 | 0 | 0 | 0 | 0 | 0 | 0 | 0 | 0 | 10 | 20 |

TABLE 6

| | Example | | | | | | | | | | | | | | | | | | | | |
|---|---|---|---|---|---|---|---|---|---|---|---|---|---|---|---|---|---|---|---|---|---|
| | 22 | 23 | 24 | 25 | 26 | 27 | 28 | 29 | 30 | 31 | 32 | 33 | 34 | 35 | 36 | 37 | 38 | 39 | 40 | 41 | 42 | 43 |
| Storage stability | o | o | o | o | o | o | o | o | o | o | o | o | o | o | o | o | o | o | o | o | o | o |
| Drying property | o | o | o | o | o | o | o | o | o | o | o | o | o | o | o | o | o | o | o | o | o | o |
| Adhesion to substrate | o | o | o | o | o | o | o | o | o | o | o | o | o | o | o | o | o | o | o | o | o | o |
| Surface slip angle (degrees) | 8.6 | 8.4 | 8.7 | 7.9 | 8.1 | 8.4 | 7.5 | 8.3 | 8.6 | 8.1 | 7.9 | 8.6 | 8.3 | 8.7 | 8.4 | 8.8 | 8.9 | 8.5 | 8.5 | 7.9 | 9.4 | 9.5 |
| Antifouling test | | | | | | | | | | | | | | | | | | | | | | |
| 3 mo. | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6 mo. | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| % Attachment of fouling organisms | | | | | | | | | | | | | | | | | | | | | | |
| 12 mo. | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 18 mo. | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 24 mo. | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 30 mo. | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 36 mo. | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 42 mo. | — | — | — | — | — | — | — | — | — | — | — | — | — | — | — | — | — | — | — | — | — | — |
| 48 mo. | — | — | — | — | — | — | — | — | — | — | — | — | — | — | — | — | — | — | — | — | — | — |

TABLE 7

| | Comparative Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Storage stability | o | o | o | o | o | o | x | x | x | x | Δ | o | o | o | o |
| Drying property | Δ | x | x | Δ | x | x | Δ | Δ | x | x | o | Δ | Δ | Δ | Δ |
| Adhesion to substrate | o | o | o | o | o | o | x | x | x | x | o | o | Δ | o | o |
| Surface slip angle (degrees) | 13.0 | 12.3 | 11.2 | 12.1 | 12.6 | 11.8 | 15.0 | 13.1 | 14.0 | 13.2 | 25.0 | 10.5 | 11.2 | 10.9 | 10.6 |
| Antifouling test | | | | | | | | | | | | | | | |
| 3 mo. | 0 | 0 | 0 | 0 | 0 | 0 | 5 | 0 | 0 | 0 | 0 | 0 | 0 | 0 | 0 |
| 6 mo. | 2 | 1 | 3 | 2 | 1 | 3 | 40 | 3 | 1 | 1 | 0 | 0 | 0 | 0 | 0 |
| % Attachment of fouling organisms | | | | | | | | | | | | | | | |

TABLE 7-continued

| | Comparative Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| 12 mo. | 5 | 2 | 10 | 5 | 2 | 10 | 60 | 15 | 5 | 2 | 0 | 0 | 0 | 0 | 0 |
| 18 mo. | 20 | 15 | 35 | 20 | 15 | 35 | 100 | 80 | 40 | 40 | 5 | 0 | 3 | 1 | 5 |
| 24 mo. | 50 | 40 | 70 | 50 | 40 | 70 | 100 | 95 | 70 | 60 | 20 | 2 | 10 | 5 | 10 |
| 30 mo. | 70 | 60 | 90 | 70 | 60 | 90 | 100 | 100 | 85 | 65 | 30 | 10 | 15 | 10 | 20 |
| 36 mo. | 80 | 65 | 100 | 80 | 65 | 100 | 100 | 100 | 100 | 80 | 45 | 40 | 40 | 30 | 35 |
| 42 mo. | — | — | — | — | — | — | — | — | — | — | — | — | — | — | — |
| 48 mo. | — | — | — | — | — | — | — | — | — | — | — | — | — | — | — |

As the data in Tables 5 to 7 show, the samples of antifouling coating prepared in Examples 1 to 43 were satisfactory in storage stability, drying property and adhesion to substrate. The films of coating formed from these samples had surface slip angles within the range of 7 to 10 degrees. The films of coating from the samples of Examples 1 to 8 which did not use any slipping agent also had surface slip angles within the range of 7 to 10 degrees. This shows the fact that the polymer specified by the present invention was sufficient to form a film of coating that had a satisfactory degree of surface lubricity. No attachment of fouling organisms was observed for a period of at least 24 months of immersion in seawater. In the tests conducted with the samples prepared in Examples 8, 20 and 21, slight attachment of fouling organisms was observed after 30 months, but their antifouling effects were satisfactory.

The samples prepared in Comparative Examples 1 to 6 used polymer solutions that were outside the scope of the present invention; they were unsatisfactory with respect to drying and antifouling properties and the films of coating formed therefrom had undesirably high surface slip angles.

The samples prepared in Comparative Examples 7 to 10 were silicone rubber based paints and were unsatisfactory with respect to storage stability, drying property and adhesion to substrates. They were also low in antifouling effects as manifested by the high slip angles of the films of coating formed from these paints.

The sample prepared in Comparative Example 11 was an antifouling paint based on an organotin copolymer. It was somewhat poor in storage stability and antifouling effects. The film of coating formed from this paint was rather hydrophilic and had a high surface slip angle.

The samples prepared in Comparative Examples 12 to 15 used compounds that were not within the definition of the slipping agent specified by the present invention. These samples proved to be inferior to the samples of Examples 1 to 43 in each of the performance tests conducted.

While the invention has been described in detail and with reference to specific embodiments thereof, it will be apparent to one skilled in the art that various changes and modifications can be made therein without departing from the spirit and scope thereof.

What is claimed is:

1. An antifouling paint that contains as its essential components a polymer of one or more of the monomers A represented by formula (1) and/or a copolymer composed of one or more of the monomers A and one or more monomers B selected from the group consisting of a methacrylate ester, an acrylate ester, a maleate ester, a fumarate ester, styrene, vinyltoluene, α-methylstyrene, vinyl acetate, butadiene, acrylamide, acrylonitrile, methacrylic acid, acrylic acid, and maleic acid that are radical-copolymerizable with said monomer A:

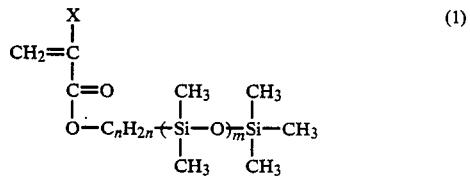

wherein X is a hydrogen atom or a methyl group; n is an integer of 2 to 4; and m signifies the average degree of polymerization and ranges from 0 to 70.

2. An antifouling paint that contains as its essential components a polymer of one or more of the monomers A represented by formula (1) and/or a copolymer composed of one or more of the monomers A and one or more monomers B that are radical-copolymerizable with said monomer A, and a slipping agent:

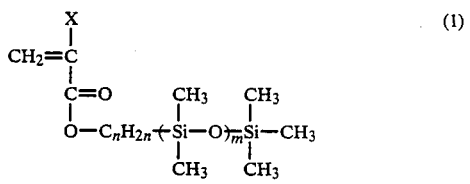

wherein X is a hydrogen atom or a methyl group; n is an integer of 2 to 4; and m signifies the average degree of polymerization and ranges from 0 to 70.

3. An antifouling paint according to claim 2, wherein the slipping agent is a petroleum wax having a melting point of from about 48.9° C. to 71° C., a microcrystalline wax having a melting point of about 60° C. or over or a petrolatum having a melting point of from about 45° C. to 80° C.

4. An antifouling paint according to claim 2, wherein the slipping agent is a liquid paraffin having a kinetic viscosity of from about 9 to 110 centistokes at 40° C.

5. An antifouling paint according to claim 2, wherein the slipping agent is a silicone oil having a kinetic viscosity of not more than 55,000 centistokes at 25° C.

6. An antifouling paint according to claim 5, wherein the silicone oil is a dimethyl silicone oil.

7. An antifouling paint according to claim 2, wherein the slipping agent is a fatty acid or ester thereof that has a melting point of −5° C. or higher and which contains at least 8 carbon atoms.

8. An antifouling paint according to claim 2, wherein the slipping agent is an organic amine having an alkyl or alkenyl group that contains 12 to 20 carbon atoms.

9. An antifouling paint according to any one of claims 2 to 8, wherein the slipping agent is present in an amount of 1 to 70 wt% of the sum of the polymer and/or copolymer and the slipping agent.

* * * * *